United States Patent [19]

Feustel et al.

[11] Patent Number: 5,277,978
[45] Date of Patent: Jan. 11, 1994

[54] POLYMERIC STABILIZERS FOR EMULSION POLYMERIZATION

[75] Inventors: Dieter Feustel, Monheim; Karl-Heinz Stritzke, Langenfeld, both of Fed. Rep. of Germany

[73] Assignee: Henkel Kommanditgesellschaft auf Aktien, Duesseldorf, Fed. Rep. of Germany

[21] Appl. No.: 852,251

[22] PCT Filed: Nov. 23, 1990

[86] PCT No.: PCT/EP90/02005

§ 371 Date: Jun. 2, 1992

§ 102(e) Date: Jun. 2, 1992

[87] PCT Pub. No.: WO91/08237

PCT Pub. Date: Jun. 13, 1991

[30] Foreign Application Priority Data

Dec. 2, 1989 [DE] Fed. Rep. of Germany ...... 3939918

[51] Int. Cl.$^5$ ................................................ C08K 5/41
[52] U.S. Cl. ..................................... 428/402; 524/156; 524/157; 524/158; 524/159; 524/832; 526/214; 526/220; 526/319; 526/330

[58] Field of Search ............... 524/156, 157, 158, 159, 524/832; 526/214, 220, 319, 330; 428/402

[56] References Cited

U.S. PATENT DOCUMENTS

| | | | |
|---|---|---|---|
| 4,525,525 | 6/1985 | Höfer et al. | 524/742 |
| 4,540,807 | 9/1985 | Longley et al. | 560/151 |
| 4,859,374 | 8/1989 | Hendricks et al. | 562/102 |

FOREIGN PATENT DOCUMENTS

| | | |
|---|---|---|
| 58224 | 4/1986 | Australia . |
| 0212184 | 10/1984 | European Pat. Off. . |
| 0281838 | 9/1988 | European Pat. Off. . |
| 2540468 | 3/1977 | Fed. Rep. of Germany . |
| 3519678 | 12/1986 | Fed. Rep. of Germany . |

Primary Examiner—Joseph L. Schofer
Assistant Examiner—M. Nagumo
Attorney, Agent, or Firm—Ernest G. Szoke; Wayne C. Jaeschke; Real J. Grandmaison

[57] ABSTRACT

The process of producing a stable polymer dispersion by aqueous emulsion polymerization of an ethylenically unsaturated monomer in the presence of a stabilizer selected from a polyester or polyamide containing a sulfate or sulfonate group.

20 Claims, No Drawings

POLYMERIC STABILIZERS FOR EMULSION POLYMERIZATION

BACKGROUND OF THE INVENTION

1. Field of the Invention

This invention relates to the use of polyesters and/or polyamides containing sulfate and/or sulfonate groups as stabilizers for the emulsion polymerization of ethylenically unsaturated monomers, to a process for the production of stable polymer dispersions and to their use.

One of the particular advantages which emulsion polymerization is known to have over other processes, such as bulk or solution polymerization, is that, on the one hand, an emulsion-polymerized product is present in an ideal form (as a latex) for use in paints, coating compounds, adhesives and impregnating compounds and, on the other hand, emulsion polymerization is particularly suitable for simple process control.

In processes of the type in question, the choice of the emulsifier is a very important factor both in regard to process control and in regard to the properties of the subsequent latex. Thus, the emulsifier should form a stable emulsion between the monomer and water phases on the one hand and, subsequently, a stable latex on the other hand. Since the emulsifier remains in the end product, it should not impart any negative properties to the end product. For example, it is often undesirable if the emulsifiers used float to the surface during drying of the latex and lead to discoloration and/or inadequate water resistance of the film formed.

2. Discussion of Related Art

Numerous emulsifiers have been tested for their suitability for emulsion polymerization. Accordingly, it has long been known from the literature that emulsifiers and/or water-soluble polymers (so-called protective colloids) can be used as emulsifying agents in emulsion polymerization. A review of the most important and widely used emulsifying agents can be found in G. Schulz "Die Kunststoffe", C. Hanser Verlag, 1964, in Ullmann, Encyklopädie der technischen Chemie, 4th Edition, Vol. 10, Verlag Chemie, Weinheim (1980), pages 455–461 and in J. C. Johnson "Emulsifiers and Emulsifying Techniques", Noyes Data Corporation, Park Ridge, N.J. 1979.

In addition, it is known that fine-particle dispersions having particle sizes of 0.1 $\mu$m to 0.3 $\mu$m can generally be obtained by the use of emulsifiers or surfactants in emulsion polymerization while coarse-particle dispersions having particle sizes above 1 $\mu$m can be obtained where protective colloids are used. It is generally assumed that the fine or coarse nature of the dispersions is the result of different reaction mechanisms. Polymerization in the presence of emulsifiers and/or surfactants takes place in micelles and leads to particles which are smaller than the originally dispersed monomer droplets whereas, in the presence of protective colloids, the reaction takes place in the monomer droplets so that the size of the droplets is responsible for the size of the polymer particles. The two reaction mechanisms can often be brought into place simultaneously by the combined use of emulsifiers and protective colloids or by the use of monomer-soluble radical initiators instead of water-soluble initiators. In this case, dispersions containing bimodal particles or at least dispersions having a very broad particle size distribution are generally formed. The average particle diameter is in the range from about 0.2 $\mu$m to 2 $\mu$m.

It is generally very difficult to produce emulsifier-free fine-particle polymer dispersions of high solids content. Processes for the production of stabilized polymer dispersions which enable fine-particle dispersions to be produced without the use of emulsifiers and/or surfactants have recently been disclosed in the patent and specialist literature. Although the reaction mechanism is not discussed in detail, the fine-particle emulsifier-free dispersions are said to have particular performance properties.

The stabilization of polymer dispersions with polyelectrolytes is described in DE 25 40 468. The dispersions are said to have high shear and salt stability, high pigment compatibility and only a slight tendency towards foaming. The polyelectrolytes used are water-soluble polymers containing recurring units of lateral carboxylic acid groups which are reacted off with monofunctional alcohols or primary amines which in turn bear a sulfonate function as an additional functional group. The chain is a carbon chain of the type formed, for example, by polymerization of (meth)acrylates. Although these polyelectrolytes have ester functions, they are not polyesters in the sense that the polymer chain is formed by ester units.

Polyesters and polyamides containing sulfonate groups are already known to the expert. Thus, according to DE 35 19 678 for example, polyesters containing sulfonate groups and alkyl side chains are used as dispersion aids for coal suspensions.

The polyesters in question are polyesters of carboxylic acid dialkanolamides and sulfodicarboxylic acids. These polyesters are soluble in water which is one of the requirements mentioned in the statement of problem in the above-cited patent. In addition, the fact they are suitable as dispersants for coal suspensions does not mean that they are also suitable as stabilizers for emulsion polymerization because emulsion polymerization stabilizers have to meet different and, in some cases, additional requirements, for example they must not adversely affect the performance properties of the polymer dispersion produced.

The problem addressed by the present invention was to provide stabilizers suitable for the emulsion polymerization of ethylenically unsaturated monomers which would lead to fine-particle polymer dispersions showing improved resistance to water and producing a high level of gloss in the films produced from them. In addition, there would be no need, to use emulsifiers or surfactants in this regard.

DESCRIPTION OF THE INVENTION

Other than in the operating examples, or where otherwise indicated, all numbers expressing quantities o ingredients or reaction conditions used herein are to be understood as modified in all instances by the term "about".

According to the invention, this problem has been solved by the use of polyesters and/or polyamides containing sulfate and/or sulfonate groups and showing specific solution behavior as stabilizers for the emulsion polymerization of ethylenically unsaturated monomers.

The emulsion polymerization of ethylenically unsaturated monomers per se and suitable processes are adequately described in the specialist literature, cf. Ullmann loc. cit., Vol. 19, pages 11–21 and pages 370–373. In many cases, no strict distinction is made between polymer dispersions and polymer emulsions, instead these terms are generally used synonymously.

The polymers suitable for use in accordance with the invention belong to the group of polymer surfactants and have particularly good emulsifying properties. In contrast to conventional low molecular weight surfactants or emulsifiers on the one hand and protective colloids on the other hand, the polymer surfactants used in accordance with the invention are termed stabilizers. They have such a good emulsifying effect that there is no need at all to use surfactants and/or emulsifiers for the emulsion polymerization.

The emulsifying effect and the specific solution behavior of the stabilizers used in accordance with the invention is dependent on the one hand on the basic polymer chain and, on the other hand, on the quantity of sulfate and/or sulfonate groups present. The best results may be obtained when the polyesters and/or polyamides used are selected according to the length and composition of their basic polymers chain and according to the number of sulfate and/or sulfonate groups attached thereto in such way that the stabilizers can be homogeneously taken up in water as aggregates of molecular dimensions.

In practice, the effect of this can be that aqueous preparations of the stabilizers according to the invention are clear when viewed without optical aids, but show a bluish shimmer when viewed in light. This is presumably formed by light scattering or is attributable to the Tyndall effect which may be regarded as an indication of a finely disperse suspension. On the other hand, the optically clear impression of the preparation is indicative of a "true solution", i.e. a homogeneous molecular dispersion. It is also emphasized in the specialist literature that the boundaries between dispersions and solutions are always vague rather than clear-cut. A transition stage is formed, for example, by the so-called association colloids. Molecularly disperse solutions of macromolecules are also "true" solutions in the sense of the definition, although in individual cases they may readily exhibit the behavior of colloidal systems. Although the state in which the aqueous preparations of the stabilizers according to the invention are present has not been elucidated, this transitional state does appear to be a determining factor in regard to the reaction mechanism of emulsion polymerization. This is reflected, for example, in the fact that polymers which do not correspond to the invention and which have substantially the same molecular structure, but with comparatively more sulfate and/or sulfonate groups do not show the above-described specific solution behavior of the stabilizers according to the invention, but form "true" solutions without light scattering effects. In emulsion polymerization, these solutions act more like protective colloids, i.e. are comparable with other known water-soluble polymers which involves an undesirable change in the polymerization mechanism.

Stabilizers consisting of condensates of dicarboxylic acids with diamine or diol compounds are preferably used. The compounds mentioned are essentially difunctional although this does not mean that small quantities cannot be polyfunctional or monofunctional. Compounds having an average functionality of not less than 1.9 and not more than 2.1 are preferred. The monomers of the dicarboxylic acids and/or the diamine or diol compounds at least partly contain sulfate and/or sulfonate groups. Instead of the monomers containing sulfate and/or sulfonate groups, unsaturated monomers sulfated or sulfonated after condensation may also be present. In one preferred embodiment, at least 5% to at most 50% of the monomers meet these specifications. A percentage content of 10 to 20% of these monomers is particularly preferred.

Suitable monomers containing sulfonate groups are, for example, sulfoisophthalic acid, sulfosuccinic acid, N-N (bis-hydroxyethyl)-2-aminoethylsulfonate and N-(2-ethylamino)-2-aminoethyl sulfonate.

Apart from their two carboxylic acid groups, the dicarboxylic acids may have various molecular structures. Aliphatic dicarboxylic acids, for example, are suitable. Of these, it may be preferred to use the linear unbranched species. However, side chains and/or alicycles may also be present. Dicarboxylic acids containing aromatic groups are also suitable. In the case of predominantly chain-like molecules, the carboxylic acid groups are preferably terminally positioned. Isophthalic acid and maleic acid are particularly suitable. The dicarboxylic acids may be at least partly replaced by their anhydrides and/or esters. Of the esters, alkyl esters containing a short alkyl chain are preferred, the methyl esters being particularly preferred.

The diamines may also contain aliphatic, alicyclic and/or aromatic structural elements. Linear unbranched diamines are particularly suitable. It has proved to be of advantage for the amine groups to be terminally positioned. Primary diamines are preferably used.

Among the diol compounds mentioned, polyether diols are particularly suitable. Preferred polyether diols are those which may be formally regarded as reaction products of alkoxides with water, the number of alkoxy units being from 1 to 50. The alkoxides are ethylene oxide, propylene oxide and/or butylene oxide. Other suitable diol compounds are difunctional alcohols containing aliphatic, alicyclic and/or aromatic elements in the molecular structure. Primary alcohols are preferred.

Stabilizers having an average molecular weight of 2,000 to 100,000 are particularly suitable. However, stabilizers having an average molecular weight of 4,000 to 20,000 are preferred because they provide the emulsion or dispersion with excellent stability and do not "float to the surface" during drying of the dispersion. This applies in particular to those stabilizers in which the acid value is below 50 and preferably below 25. Stabilizers having an at least predominantly linear structure are preferred. This can be achieved by suitably selecting the monomers.

The stabilizers should be present in a quantity which is sufficient to produce the desired emulsifying effects. On the other hand, the percentage content of stabilizers should not be too high both for economic reasons and also because of the potential effect on the performance properties of the emulsion polymers to be produced. Accordingly, the stabilizers are preferably used in a quantity of 0.5 to 10% by weight, based on the initial quantity of monomers. Very good results are obtained with quantities of 3 to 7% by weight of the stabilizers.

Suitable monomers are any monomers which contain at least one ethylenically unsaturated group. The expressions ethylenically unsaturated, vinylically unsaturated and $\alpha,\beta$-unsaturated are used synonymously. It has long been known to the expert that monomers of the type in question can be added to form polymers under the conditions of emulsion polymerization in aqueous medium. Such monomers include, for example, vinyl compounds, styrenes and acrylates and derivatives thereof. Suitable vinyl compounds are, for example, vinyl chloride and vinyl esters, such as vinyl acetate, vinyl propionate, and also vinyl fatty acid esters, such as vinyl laurate. Suitable styrene compounds are styrene, halostyrenes, such as chlorostyrene, fluorostyrene and iodostyrene, alkyl styrenes, such as methyl styrenes and 2,4-diethyl styrene, cyanostyrenes, hydroxystyrenes, nitrostyrenes, aminostyrenes and/or phenyl styrenes. Suitable acrylates are, for example, acrylic acid and methacrylic acid and salts and esters thereof. Mixtures of these ethylenically unsaturated monomers may of course also be polymerized in the emulsion polymerization providing they are suitable for copolymerization. Mixtures having an at least predominant percentage content by weight of vinyl esters are preferably used in accordance with the invention. A preferred vinyl ester is vinyl acetate.

Suitable catalysts are, typically, initiators which form free radicals or redox catalysts. Suitable radical-forming catalysts are, for example, typical peroxides, such as hydrogen peroxide, peracetic acid, butyl peroxide, dibenzoyl peroxide, perbenzoic acid and also persulfates, perphosphates and peroxycarbonates. Suitable redox catalyst systems are, for example, sodium persulfate/sodium formaldehyde sulfoxylate, cumeme hydroperoxide/sodium metabisulfite, hydrogen peroxide/ascorbic acid and sulfur dioxide/ammonium persulfate. Azo compounds, such as 4,4-azo-bis-(cyanopentanoic acid) are also suitable. The catalysts are used in typical catalytically active concentrations which are generally between 0.01 and 1.0% by weight, based on the dispersion.

One particular embodiment is characterized by the use of other components typical of emulsion polymerization, including for example accelerators, buffers and/or any other constituents which may be used in addition to the stabilizers according to the invention in the emulsion polymerization reaction mixture and which are known from the prior art on emulsion polymerization processes. Such constituents are, for example, $Fe^{2+}$ salts which, in combination with sodium formaldehyde sulfoxylates, accelerate the radical formation of radical initiators or buffers such as, for example, phosphates, carbonates, citrates, etc., which may be adjusted to stabilize the pH value. Additives such as these may be present in the dispersion in quantities of up to 3% by weight.

The present invention also relates to a process for the production of stable polymer emulsions which are distinguished by improved resistance to water and by a high gloss level in the films produced therefrom. These polymer dispersions are prepared by emulsion polymerization of ethylenically unsaturated monomers which polymerize to dispersed polymer particles. Emulsion polymerization processes are known to the expert. They are normally distinguished by the fact that a radical polymerization of ethylenically unsaturated monomers is carried out in aqueous phase in the presence of radical initiators and emulsifiers, protective colloids or other stabilizers. The components mentioned may be introduced into the emulsion polymerization in various ways. Normally, the aqueous phase is largely introduced first, the addition of small quantities of water during the reaction in the form of a radical initiator solution or monomer pre-emulsion not being uncommon. The emulsifiers, protective colloids or other stabilizers may be partly introduced at the beginning and the rest added in the course of polymerization. The monomers may be completely introduced at the beginning or may be added in pure form or as a pre-emulsion in water. The radical initiator is generally introduced at least partly at the beginning and is partly added in the form of an aqueous solution. The mixture which is introduced into the reactor before the reaction temperature of, normally, 40° to 90° C. is established is called the starter. The polymerization is generally initiated by thermal decomposition of the radical initiator and may be regarded as complete when most of the monomers capable of being reacted by radical chain reaction have reacted off. Approximately 0.1 to 1% by weight residual monomers normally remain behind in this process. Other processes and variants are described in detail, for example, in Ullmann loc. cit., Vol. 19, pages 132 et seq. and in Encyclopedia of Polymer Science and Engineering, Volume 6, Wiley & Sons, New York 1986, pages 1–51.

Normally, the sole use of protective colloids in the polymerization results in dispersions having an average particle size of up to 10 $\mu$m. If only ionic emulsifiers and/or surfactants are used, particles having average particle diameters of 0.1 $\mu$m to 0.3 $\mu$m are formed. Where both types are combined, the average particle diameter is between about 0.2 $\mu$m and 2 $\mu$m.

The process according to the invention for the production of stable polymer dispersions—having improved resistance to water and producing a high gloss level in the films produced from them—by emulsion polymerization of ethylenically unsaturated monomers is characterized by the use of polyesters and/or polyamides containing sulfate and/or sulfonate groups and having specific solution behavior as stabilizers. The emulsion polymerization may be carried out in the manner described above, preferably in the total absence of surfactants and/or emulsifiers.

The stabilizers used in accordance with the invention may be produced immediately before the process according to the invention is carried out by condensation of alcohols or amines with carboxylic acids in the presence of esterification catalysts. In the esterification reaction, the water formed is normally removed by a suitable entraining agent, such as for example toluene or xylene, so that the desired degree of polymerization of the stabilizers according to the invention is reached. The average molecular weight of the stabilizer can be calculated from the quantity of condensed water distilled off. The condensation is typically carried out at temperatures of 140° to 220° C., preferably in the same reaction vessel as the subsequent process according to the invention.

The present invention also relates to polymer dispersions produced by the above-described process according to the invention. These stable polymer dispersions are distinguished by improved resistance to water of the films produced from them. They contain 20 to 65% by weight dispersed or emulsified homopolymer or copolymer based on ethylenically unsaturated monomers. In addition, 0.1 to 6.5% by weight stabilizers are present. Catalysts are present in typical quantities in which they develop their catalytic activity and generally in quantities of from about 0.01 to 1% by weight. If desired, additives known to the expert on emulsion polymerization may also be present in the usual quantities which may generally be up to 3% by weight. The balance to 100% by weight is water. According to the invention, the stabilizers consist of polyesters and/or polyamides containing sulfate and/or sulfonate groups and having specific solution behavior. The polymer dispersions preferably contain dispersed polymer particles having an average particle diameter of 0.05 to 3 µm. Polymer dispersions having an average particle diameter of 0.1 to 1 µm show particularly good performance properties and are therefore preferred.

Polymer dispersions or emulsion polymers of the type in question have a broad range of applications. They are preferably used in adhesives, particularly for paint and/or wood. By virtue of the high degree of gloss and increased water resistance of their films, the polymer dispersions are preferably used in textile finishing preparations. The absence of coagulate and specks in the polymer dispersion and its high stability in storage together with the positive properties already mentioned make the polymer dispersion particularly suitable for use as a binder in emulsion paints.

The preparation of stabilizers suitable for use in accordance with the invention and the preparation of stable polymer dispersions of ethylenically unsaturated monomers by emulsion polymerization is illustrated by the following Examples.

EXAMPLES

Example 1

(a) 315 g (2.1 mol) triethylene glycol, 129.5 g (0.875 mol) phthalic anhydride, 85.8 g (0.875 mol) maleic anhydride and 1.7 g esterification catalyst were introduced together with 80 g toluene into a four-necked flask equipped with a stirrer, a water separator over a reflux condenser (980) a thermometer and a nitrogen inlet pipe and heated by an oil bath (220° C.). 31 ml $H_2O$ were azeotropically distilled off over a period of 8 hours. The toluene was then distilled in vacuo and the reaction mixture was cooled to room temperature. The polyester (acid value=1.6; OH value=72) was then sulfonated for 2.5 hours at 80° C. in a solution of 82.3 g $Na_2S_2O_5$ in 680 ml $H_2O$ and 120 ml isopropanol. The solution was then filtered and distilled to a solids content of 40%.

(b) 31.25 g of the 40% aqueous polyester preparation were heated on a water bath to 80° C. together with 233 g $H_2O$, 0.25 g ammonium peroxysulfate and 20 g vinyl acetate in a 1 liter four-necked flask equipped with a stirrer, a reflux condenser, two dropping funnels, a thermometer and an $NH_2$ inlet. After reaching the reaction temperature, 180 g vinyl acetate and 0.75 g potassium peroxodisulfate dissolved in 30 ml $H_2O$ were added dropwise over a period of 2 hours. After the monomers had been added, the polymerization mixture was stirred for 1 hour at 80° C. The dispersion was then cooled to room temperature. The dispersion had an average particle size of 180 to 190 nm and a coagulate content of approximately 1% by weight. Clear, glossy films could be produced from the dispersion.

Example 2

(a) 227 g (2.14 mol) diethylene glycol, 47.7 g (0.113 mol) polypropylene glycol 420, 337.9 g (2.034 mol) isophthalic acid, 62.75 g (0.234 mol) sulfoisophthalic acid sodium salt and 3.2 g esterification catalyst were condensed together with 100 g toluene under the same reaction conditions as in Example 1 (a), 78 g $H_2O$ being azeotropically distilled off. The polyester had an acid value of 19.2.

(b) 12.5 g polyester were taken up in 251.5 g $H_2O$. 0.25 g ammonium peroxodisulfate dissolved in 5 g $H_2O$ and 20 g vinyl acetate were added. The mixture was reacted as in Example 1 (b) and 180 g vinyl acetate and 0.75 g potassium peroxodisulfate in 30 g $H_2O$ were added dropwise over a period of 2 hours. After the monomers had been added, the polymerization mixture was stirred for 1 hour and the dispersion was subsequently cooled to room temperature. The dispersion had an average particle size of 110 to 115 nm and a coagulate content of less than 1% by weight. Clear glossy films could be formed from the dispersion.

Example 3

(a) 212 g (2.0 mol) diethylene glycol, 296 g (2.0 mol) phthalic anhydride, 19 q (0.1 mol) of a 92.5% solution of N-(2-ethylamino)-2-aminoethyl sulfonate in $H_2O$ and 2.4 g esterification catalyst were condensed together with 60 g toluene under the same reaction conditions as in Example 1 (a), 39 g $H_2O$ being azeotropically distilled off. The polyester had an acid value of 12.1 and an OH value of 36.5.

(b) 12.5 g polyester were taken up in 251.5 g $H_2O$ and adjusted with NaOH (2N) to pH 7.0. 0.25 g ammonium peroxodisulfate dissolved in 5 g $H_2O$ and 20 g vinyl acetate were added and reacted as in Example 1 (a). 180 g vinyl acetate and 0.75 g potassium peroxodisulfate in 30 g $H_2O$ were added dropwise over a period of 2 hours, followed by stirring for 1 hour at 80° C. The dispersion had an average particle size of 180 to 185 nm and a coagulate content of approximately 2% by weight. Clear glossy films could be formed from the dispersion.

Test For Water Resistance of the Polymer Films Produced From The Polymer Emulsions of Examples 1 to 3

The water resistance of the polymer films was tested by storage of the 100 µm thick films drawn on a glass plate in a closed half-filled glass vessel. The height of the water level was selected so that half the film was immersed in water while the other half was only in contact with the gas phase (100% humidity).

The water resistance of the films was visually evaluated from the degree of clouding of the film. All the films were dried for 1 week at room temperature before being tested for water resistance.

Since even pure polyvinyl acetate (PVAc) does not give 100% water-resistant films, it is appropriate to evaluate the individual results in relation to comparison films. A film drawn from a PVAc which had been polymerized in solution (because no additives apart from the initiator are required for solution polymerization, water absorption in this case corresponds to that of pure PVAc) was used as a reference film for maximum water resistance. A film drawn from a VAc dispersion stabilized with nonyl phenol 30 EO sulfate, Na salt (1.5% by weight) and nonyl phenol 30 EO (1% by weight) was used as a second reference film (percentages by weight, based on mixture, 40% by weight polymer content, 1% by weight initiator).

Results

1. Film of solution polymer: After 30 minutes storage in the test vessel, the half submerged in water had become faintly white while the unwetted half had remained clear.
2. Film of surfactant-containing dispersion: The film swelled distinctly in less than 30 minutes and became white and opaque (both halves). The half of the film immersed in water separated completely from the substrate.

3. Films of the dispersions of Examples 1 to 3: All the films turned white over the half immersed in water, but did not separate from the substrate. The halves in contact with the gas phase became faintly to moderately white, but remained transparent. The films did not separate from the substrate.

We claim:

1. The process of producing a stable polymer dispersion by aqueous emulsion polymerization of an ethylenically unsaturated monomer, comprising conducting said emulsion polymerization in the presence of a stabilizer selected from the group consisting of a difunctional polyester containing a sulfate or sulfonate group and a difunctional polyamide containing a sulfate or sulfonate group, said polyester and said polyamide having been obtained by condensation of a dicarboxylic acid, its anhydride or ester, with a diamine or a diol and having an average molecular weight of about 2,000 to about 100,000

2. The product of claim 1.

3. A process as in claim 1 wherein said stabilizer has a linear structure.

4. The product of claim 3.

5. A process as in claim 1 wherein from about 0.5 to about 10% by weight of said stabilizer, based on the weight of said monomer, is present during said emulsion polymerization.

6. The product of claim 5.

7. A process as in claim 1 wherein said diamine comprises a primary diamine.

8. The product of claim 7.

9. A process as in claim 1 wherein said diol comprises a polyether diol.

10. The product of claim 9.

11. A process as in claim 9 wherein said polyether diol contains from about 1 to about 50 alkoxy units.

12. The product of claim 11.

13. A process as in claim 1 wherein said diol is selected from the group consisting of a difunctional alcohol containing an aliphatic, alicyclic or aromatic radical, and a primary alcohol.

14. A process as in claim 1 wherein said stabilizer has an average molecular weight of about 4,000 to about 20,000.

15. A process as in claim 1 wherein said stabilizer has an acid value of less than about 50.

16. A process as in claim 1 wherein said monomer is selected from the group consisting of vinyl compounds, styrenes, acrylates and derivatives thereof.

17. The product of claim 16.

18. A process as in claim 1 wherein said emulsion polymerization is conducted in the presence of a conventional component selected from the group consisting of a catalyst, an accelerator, and a buffer.

19. A stable polymer dispersion containing from about 20 to about 65% by weight of a polymer prepared by the process of claim 1, about 0.1 to about 6.5% by weight of a stabilizer according to claim 1, and the balance water, all weights being based on the weight of said polymer dispersion.

20. A polymer dispersion as in claim 19 wherein the polymer particles have an average particle diameter of from about 0.05 to about 3 microns.

* * * * *